United States Patent
Verbeke

(10) Patent No.: US 12,406,477 B2
(45) Date of Patent: Sep. 2, 2025

(54) ITERATIVE REFINEMENT OF ANNOTATED DATASETS

(71) Applicant: ZENSEACT AB, Gothenburg (SE)

(72) Inventor: Willem Verbeke, Gothenburg (SE)

(73) Assignee: ZENSEACT AB, Gothenburg (SE)

( * ) Notice: Subject to any disclaimer, the term of this patent is extended or adjusted under 35 U.S.C. 154(b) by 402 days.

(21) Appl. No.: 18/164,808

(22) Filed: Feb. 6, 2023

(65) Prior Publication Data

US 2023/0260257 A1    Aug. 17, 2023

(30) Foreign Application Priority Data

Feb. 11, 2022    (EP) .................................... 22156360

(51) Int. Cl.
G06V 10/00        (2022.01)
G06V 10/774       (2022.01)
G06V 10/778       (2022.01)

(52) U.S. Cl.
CPC .......... G06V 10/774 (2022.01); G06V 10/778 (2022.01)

(58) Field of Classification Search
CPC ........ G06N 20/00; G06N 20/10; G06N 20/20; G06V 10/82; G06V 10/70; G06V 10/7747; G06V 10/778; G06V 10/776; G06V 10/774
See application file for complete search history.

(56) References Cited

U.S. PATENT DOCUMENTS

| | | | |
|---|---|---|---|
| 10,289,963 B2 * | 5/2019 | Chiticariu | G06F 16/35 |
| 10,769,484 B2 * | 9/2020 | Zhang | G06V 30/153 |
| 10,997,466 B2 * | 5/2021 | Peng | G06F 18/2155 |
| 11,048,979 B1 * | 6/2021 | Zhdanov | G06F 18/2155 |
| 11,308,358 B2 * | 4/2022 | Van Oldenborgh | G06V 10/225 |
| 11,366,988 B2 * | 6/2022 | Khan | G06V 10/774 |
| 11,443,416 B2 * | 9/2022 | Liao | G06F 16/5854 |
| 11,663,711 B1 * | 5/2023 | Amouie | G06V 10/774 348/143 |
| 12,079,208 B2 * | 9/2024 | Liu | G06F 16/24573 |
| 12,094,181 B2 * | 9/2024 | Ranganathan | G06V 10/255 |
| 12,153,598 B1 * | 11/2024 | Agarwal | G06N 20/00 |
| 2020/0380312 A1 * | 12/2020 | Khan | G06F 18/2185 |
| 2021/0224598 A1 | 7/2021 | Li | |

OTHER PUBLICATIONS

Extended European Search Report mailed Jul. 27, 2022 for European Application No. 22156360.4, 9 pages.

* cited by examiner

*Primary Examiner* — Amir Alavi
(74) *Attorney, Agent, or Firm* — Sage Patent Group

(57) ABSTRACT

The present disclosure relates to a method for determining a state of a vehicle on a road portion having two or more lanes. The method includes obtaining map data associated with the road portion and positioning data indicating a position of the vehicle on the road and a sensor data from a sensor system of the vehicle. The method further includes initializing a filter per lane of the road portion based on the obtained map data, the obtained positioning data, and the obtained sensor data, wherein each filter indicates an estimated state of the vehicle on the road portion. Then, selecting one of the initialized filters using a trained machine-learning algorithm, configured to use the obtained map data, the positioning data, the sensor data, and each estimated state as indicated by each filter as input and to output a current state of the vehicle on the road portion.

15 Claims, 2 Drawing Sheets

ITERATIVE REFINEMENT OF ANNOTATED DATASETS

CROSS-REFERENCE TO RELATED APPLICATIONS

The present application for patent claims priority to European Patent Office Application Ser. No. 22156360.4, entitled "ITERATIVE REFINEMENT OF ANNOTATED DATASETS" filed on Feb. 11, 2022, assigned to the assignee thereof, and expressly incorporated herein by reference.

TECHNICAL FIELD

The present invention relates to the general field of computer science and machine-learning. In particular, the present invention relates to methods for improving annotated datasets for training machine-learning algorithms suitable for autonomous driving applications.

BACKGROUND

Autonomous systems have the ability to act independently of direct human control and in unrehearsed conditions. These systems enable a whole range of applications, such as self-driving cars, humanoid robots and post-delivering drones.

Machine-learning is a promising technology in the area of perception, for example in order to detect and classify objects in images, video streams and/or LIDAR point clouds. However, the problem with machine-learning algorithms such as neural networks is that they quickly reach some level of performance (maturity), and then extremely large amounts of data are required to get truly high performance.

In more detail, the training of machine-learning algorithms such as neural networks, often requires large amounts of annotated/labelled data. In the case of computer vision object detection this annotation could for instance include marking the presences of cars, pedestrians, traffic signs, and so forth on a large amount of images and then training a neural network to predict their presence, location, distance from the observer, etc. In short, every property such machine-learning algorithms predict requires some labels in the data set.

The performance a neural network can achieve in solving its goal depends on the quality and size of the dataset it is trained with. While more data is better, one must remember that mistakes made in the annotation of training data will result in mistakes made by the machine-learning algorithm once it is employed. Such mistakes will limit the potential of a machine-learning algorithm to find a general solution to the task.

Thus, there is a need in the art for new and efficient solutions for improving annotations in datasets used for training machine-learning algorithms in order to be able to provide more performant autonomous systems.

SUMMARY

It is therefore an object of the present invention to provide a method for improving annotated datasets for training machine-learning algorithms.

This object is achieved by means of a method for improving annotated datasets for training machine-learning algorithms as defined in the appended independent claims. The term exemplary is in the present context to be understood as serving as an instance, example or illustration.

According to a first aspect of the present invention, there is provided a method for improving annotated datasets for training machine-learning algorithms. The method comprises:

i) annotating a dataset by means of a first machine-learning algorithm, wherein the dataset comprises a plurality of images and wherein the first machine-learning algorithm is configured to annotate the plurality of images by generating annotations for one or more features comprised in the plurality of images;

ii) training a second machine learning algorithm based on at least a first subset of the annotated dataset;

iii) evaluating the annotated dataset by:
  a. using at least a second subset of the annotated dataset as an input dataset for the trained second machine learning algorithm in order to generate an output dataset comprising predictions of the one or more features, and
  b. comparing the predictions generated by the trained second machine learning algorithm with the annotations generated by the first machine learning algorithm in order to extract an erroneous dataset from the input dataset, wherein the erroneous dataset comprises images associated with indications of annotation errors and/or missing annotations in the annotated dataset;

iv) re-annotating the erroneous dataset so to form a re-annotated dataset;

v) repeating step ii) on the re-annotated dataset and repeating steps iii)-iv) until a number of images associated with indications of annotation errors and/or missing annotations is below a threshold.

According to a second aspect of the present invention, there is provided a method for improving annotated datasets for training machine-learning algorithms. The method comprises:

i) obtaining an annotated dataset comprising a plurality of images and annotations for one or more features comprised in the plurality of images;

ii) training a machine learning algorithm based on at least a first subset of the annotated dataset;

iii) evaluating the annotated dataset by:
  a. using at least a second subset of the annotated dataset as an input dataset for the trained machine learning algorithm in order to generate an output dataset comprising predictions of the one or more features, and
  b. comparing the predictions generated by the trained machine learning algorithm with the annotations generated by the first machine learning algorithm in order to extract an erroneous dataset from the input dataset, wherein the erroneous dataset comprises images associated with indications of annotation errors and/or missing annotations in the annotated dataset;

iv) obtaining a re-annotated dataset based on the erroneous dataset;

v) repeating step ii) on the re-annotated dataset and repeating steps iii)-iv) until a number of images associated with indications of annotation errors and/or missing annotations is below a threshold.

With this aspect of the invention, similar advantages and preferred features are present as in the previously discussed first aspect of the invention.

According to a second aspect of the present invention, there is provided a method for improving annotated datasets for training machine-learning algorithms. The method comprises:

i) annotating a dataset by means of a first machine-learning algorithm, wherein the dataset comprises a plurality of images and wherein the first machine-learning algorithm is configured to annotate the plurality of images by generating annotations for one or more features comprised in the plurality of images;

ii) transmitting the annotated dataset to a remote entity comprising a second machine learning algorithm configured to use the annotated dataset as an input dataset in order to generate an output dataset comprising predictions of the one or more features;

iii) obtaining an erroneous dataset comprising images associated with indications of annotation errors and/or missing annotations in the annotated dataset;

iv) re-annotating the erroneous dataset so to form a re-annotated dataset;

v) repeating step ii) on the re-annotated dataset and repeating steps iii)-iv) until a number of images associated with indications of annotation errors and/or missing annotations is below a threshold;

vi) training the first machine learning algorithm based on the re-annotated dataset used in a last iteration when the number of images associated with indications of annotation errors and/or missing annotations got below the threshold.

With this aspect of the invention, similar advantages and preferred features are present as in the previously discussed first aspect of the invention.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
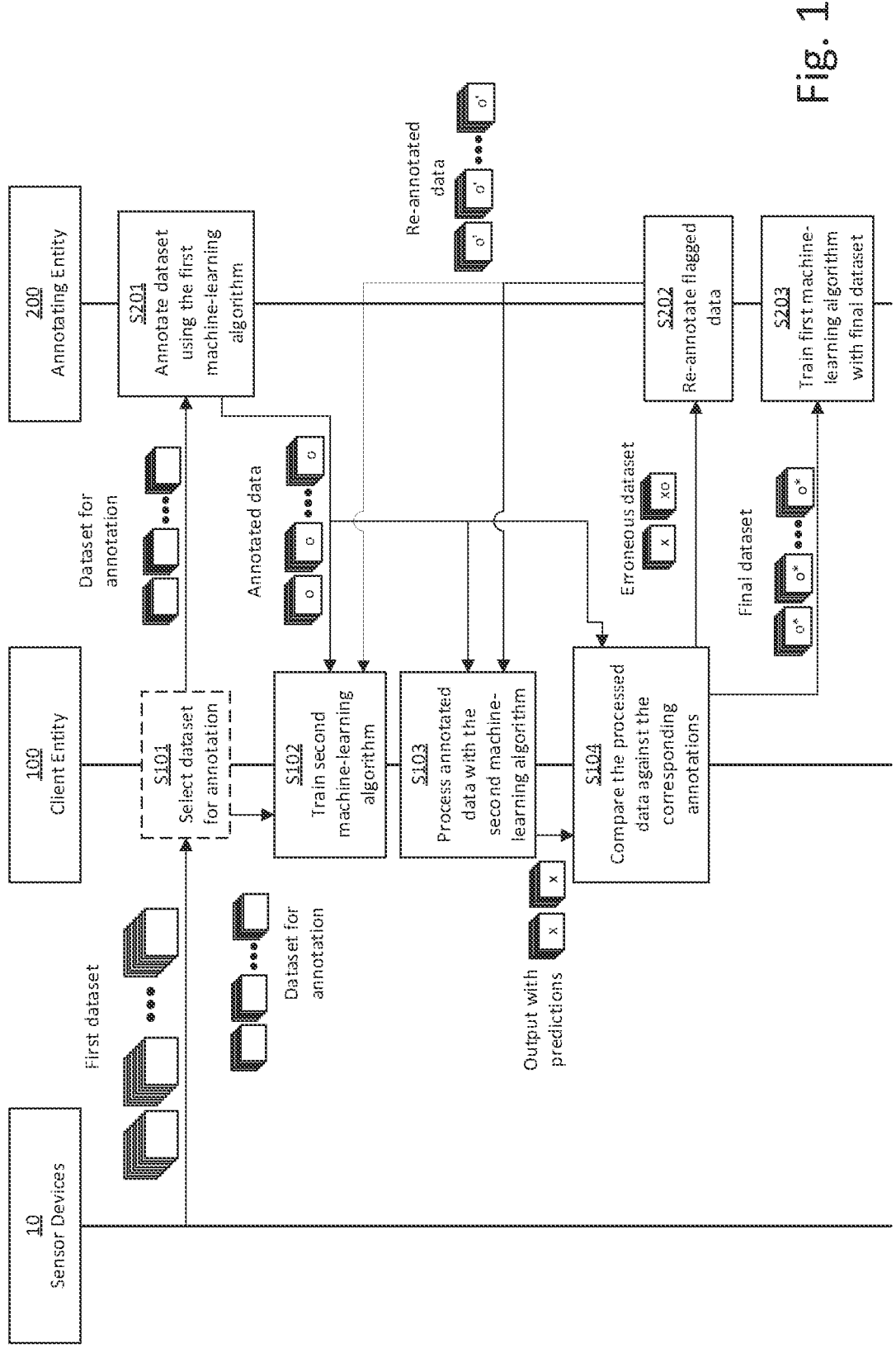
FIG. 1 is a schematic flowchart representation of a method for improving annotated datasets for training machine-learning algorithms in accordance with some embodiments.

In the following detailed description, embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs), Field Programmable Gate Arrays (FPGA) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the at least some of steps, services and functions disclosed herein when executed by the one or more processors.

As mentioned in the foregoing, the performance that a supervised machine-learning algorithm can achieve in solving its task depends on the quality and size of the training dataset. While more data generally leads to better performance, mistakes made in the annotation of data will unavoidably result in mistakes made by the supervised machine-learning algorithm in deployment. Such mistakes will limit the potential of the supervised machine learning algorithm to find a general solution to the task. Thus, more training data may only be "better" if the training data is correct.

For technical systems that rely on machine-learning algorithms, and in particular in the field of Automated Driving Systems (ADSs) it is important to have reliable outputs for various perception features such as e.g., object detection, object classification, free-space estimation, road boundary tracing, and so forth. A general problem for companies operating in the ADS field is that the high-quality datasets (i.e. datasets that contain few-to-no mistakes) used for developing perception features are extremely costly. Moreover, in object detection datasets many of the mistakes are in the form of missing annotations, e.g. vehicles or pedestrians not being annotated. Other common mistakes include annotation errors (i.e. incorrect annotations), such as e.g. a stop sign being labelled as a speed limit sign. Such erroneous/missing annotations have a negative impact on the performance of the machine-learning algorithms, which unavoidable delays any intended launches. Advanced Driver Assistance System (ADAS) and Autonomous Driving (AD) will herein be referred to under the common term Automated Driving System (ADS) corresponding to all of the different levels of automation as for example defined by the SAE J3016 levels (0-5) of driving automation. Even though the examples provided herein are in reference to the autonomous driving field, the teachings herein may also be applied to other fields of technology utilizing machine-vision systems.

Moreover, correcting these erroneous/missing annotations is oftentimes a herculean task associated with significant costs (both for the client entity that uses the annotated data and the annotating entity that generates the annotated data). Conventionally, the annotating entity will "pre-annotate" a dataset using a machine-learning algorithm configured to annotate images. The pre-annotated dataset is then manually checked and corrected (adjusting annotations and fixing mislabeled properties), whereupon the pre-annotating algorithm is re-trained on the manually corrected dataset, and the manually corrected dataset is sent to the client entity (e.g. a company that ordered the annotated dataset). However, the manual check and correction is oftentimes error-prone (extremely large datasets and human error), resulting in that mistakes will be learned by the "pre-annotating" machine-learning algorithm and reinforced in future annotations. Eventually, the "pre-annotating" machine-learning algorithm will stop improving because of these mistakes. Additionally, the machine-learning algorithms of the client entity will also suffer from reduced performance due to these mistakes.

Therefore it is herein suggested to employ an iterative data-annotation refinement scheme, which serves to improve the datasets used for training the machine-learning algorithms in a more efficient manner as compared to conventional solutions, thereby enabling for more performant machine-learning algorithms, both for the client entity and the annotating entity's "pre-annotating" machine learning algorithm.

Some embodiments herein propose a setup where the machine-learning algorithm that consumes the annotated dataset is used to also evaluate the annotations made by the annotating entity. Thereby it is possible to obtain an automated and efficient evaluation of the annotations, which in turn enables for a better refinement of training datasets for machine-learning algorithms, in a cost effective manner.

Figure 2:
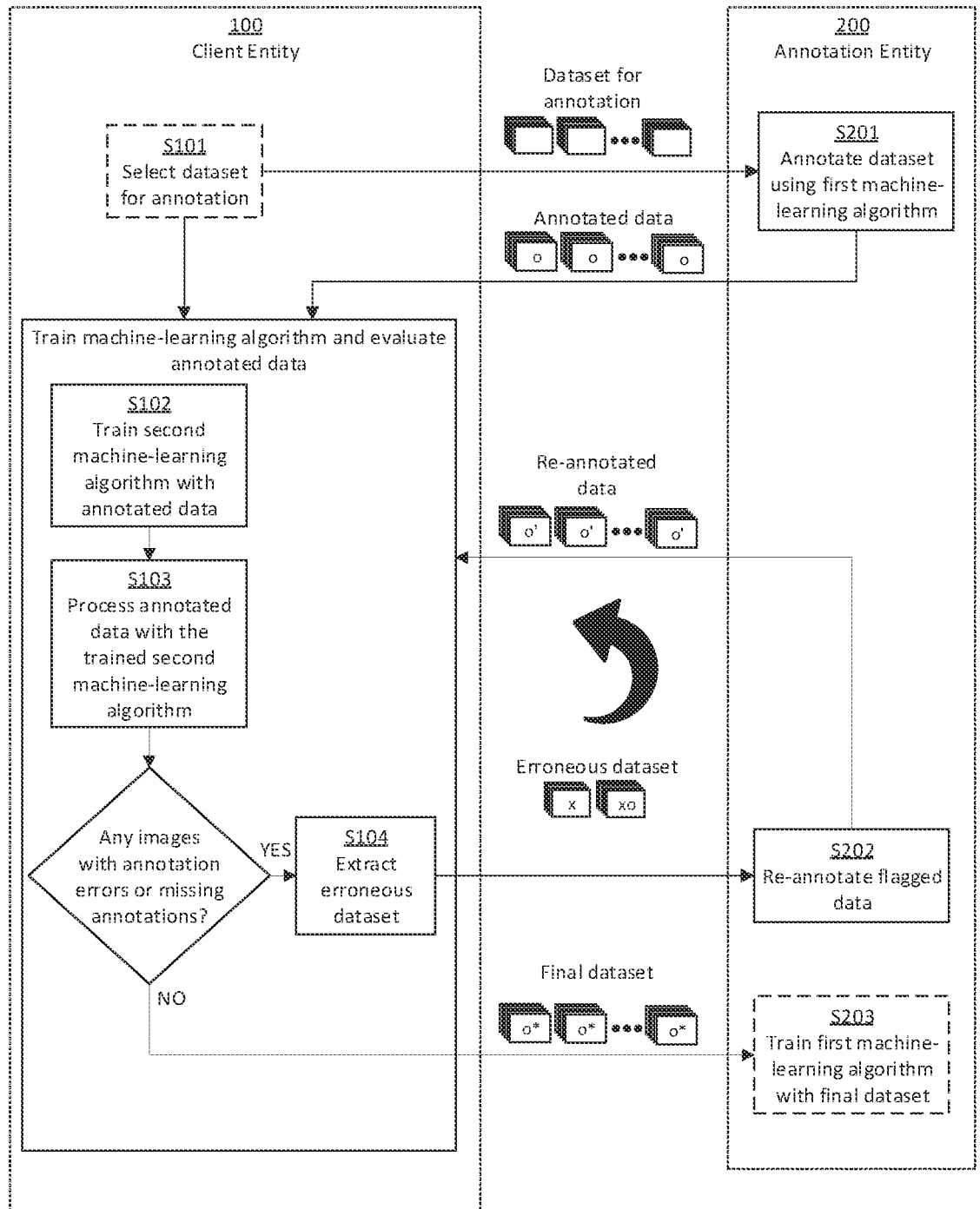
FIG. 2 is a schematic flowchart representation of a method for improving annotated datasets for training machine-learning algorithms in accordance with some embodiments.

FIGS. 1 and 2 are schematic flowchart representations of a method for improving annotated datasets for training machine-learning algorithms in accordance with some embodiments. In more detail, FIG. 1 and FIG. 2 show the information flow between various steps of the method, as well as between the two example entities implementing specific parts of the method in accordance with some embodiments. The depicted example embodiments serve to illustrate the herein proposed iterative data refinement scheme, performed by a client entity 100 and an annotating entity 200 in tandem (i.e. in conjunction with each other).

In some embodiments, the method comprises obtaining a first dataset from sensor data generated by one or more sensor devices 10, and selecting S101 a subset of the first dataset, where the selected subset forms the dataset to be used for annotation. The dataset to be used for annotation comprises a plurality of images, such as e.g. images generated by monocular cameras, stereo cameras, radar devices, and/or LiDAR devices. In other words, in some embodiments, the dataset to be used for annotation comprises at least one of a plurality of monocular camera images, a plurality of stereo camera images, a plurality of radar images, and a plurality of LiDAR images. The term obtaining is herein to be interpreted broadly and encompasses receiving, retrieving, collecting, acquiring, and so forth.

In other words, the client entity 100, e.g. an ADS development company, collects data from e.g. test vehicles and/or the production fleet vehicles, and selects S101 suitable subset of the collected data to be annotated. The term "suitable" in reference to datasets may be understood as images comprising relevant data during relevant conditions. For example, if one wants to train/develop a machine-learning algorithm to be able to detect and classify objects during night time conditions, then one may select images that are taken during the night. Similarly, if an object of a machine-learning algorithm is to detect traffic lights, then one may select images that are taken during driving sessions in urban environments and remove images that are taken during driving sessions on rural country roads, and so forth.

The selected S101 subset of the first dataset, i.e. the dataset to be used for annotation, is subsequently transmitted to the annotating entity 200. However, the collection and selection S101 may also be performed by an entity different from the client entity 100, such as e.g. the annotating entity 200.

Further, the method comprises annotating S201 the dataset (i.e. the selected S101 subset) by means of a first machine-learning algorithm (may be referred to as an annotating machine-learning algorithm, an annotation engine, an automated annotation algorithm, and so forth). In more detail, the dataset comprises a plurality of images and the first machine-learning algorithm is configured to annotate the plurality of images (i.e. to label the images so that a "machine" can use it) by generating annotations for one or more features comprised in the plurality of images. The annotations may for example be in the form of bounding boxes and/or semantic information related to one or more features in an image. Furthermore, the annotation S201 may be succeeded by a manual audit process, where the annotated S201 dataset is manually reviewed in order to correct any obvious errors or mistakes made by the first machine learning algorithm. The annotated S201 dataset may then be transmitted back to the client entity 100 that supplied the original dataset.

The method further comprises training S102 a second machine learning algorithm based on at least a first subset of the annotated data set. In other words, parts or all of the annotated S201 dataset is used to train S102 a second machine learning algorithm. The second machine learning algorithm may be understood as a perception algorithm (e.g. in an ADS context) configured to receive image data as input and generate predictions/detections of one or more features in the image data, such as e.g. detection of objects, classification of objects, distance estimations, free-space estimations, and so forth.

In some embodiments, the training S102 of the second machine learning algorithm comprises using supervised learning with the first subset and a corresponding subset of the dataset used in the annotation (i.e. a corresponding part of the selected S101 subset), wherein the first subset forms a supervisory signal for the corresponding subset of the dataset used in the annotation.

Further, the method comprises evaluating the annotated dataset. The evaluation is performed by using S103 at least a second subset of the annotated dataset as an "input dataset" for the trained S102 second machine learning algorithm in order to generate an "output dataset" comprising predictions of the one or more features (comprised in the plurality of images). In other words, at least a second subset of the annotated dataset is processed S103 by the trained second machine learning algorithm in order to generate the output dataset.

Further, the evaluation includes comparing S104 the predictions generated by the trained second machine learning algorithm with the annotations generated by the first machine learning algorithm in order to extract an erroneous dataset from the input dataset. The erroneous dataset accordingly comprises images associated with indications of annotation errors and/or missing annotations in the annotated dataset. An indication generally may explicitly and/or implicitly indicate the information it represents and/or indicates.

Moreover, the result from the comparison between the output from the trained second machine-learning algorithm and the corresponding annotated dataset may be treated as indications of potential annotation errors and/or missing annotations, to be followed up by a manual verification process to form the final erroneous dataset (i.e. to extract the erroneous dataset).

The erroneous dataset may for example be formed by the "worst" portion of the evaluated dataset (i.e. at least the second subset of the annotated dataset). For example, in some embodiments the erroneous dataset comprises all of the images of the evaluated dataset that are associated with errors above an error threshold. In some embodiments, the erroneous dataset comprises the X % of the images of the evaluated dataset that are associated with the most annotation errors and/or missing annotations, where X may be a number between 1 and 50 (i.e. the erroneous dataset may comprise the "worst" 1%, the "worst" 5%, the "worst" 10%, etc. of the evaluated dataset). In other words, the erroneous dataset may be formed from the images that are associated with the "lowest score" in terms of accurate and/or complete annotations as given by the comparison S104.

In some embodiments, the second machine learning algorithm is a classification machine-learning algorithm, and the indications of annotation errors are defined by a confidence score of the prediction being below a threshold. Stated differently, one may form the erroneous dataset based on the confidence scores of the predictions (for the annotated class), so that for example, any image comprising one or more predictions with a confidence score (for the annotated class) below a defined percentage (e.g. a percentage value between 70% and 95%) is considered as having one or more annotation errors and/or missing annotations. Same as before, the erroneous dataset may be formed from the X % of the annotated dataset associated with the lowest confidence scores (for the annotated class). In reference to the "for the annotated class" terminology, one may consider a situation where an image has an image features that is annotated as "class A", while the evaluation generated an output of class A prediction for the feature with a confidence score of 99.9%, but also a class B prediction for the same feature with a confidence score of 0.1%, then that annotation would be deemed as "correct" even though the image contained a prediction with a very low confidence score (but for a non-annotated class).

Moreover, for each iteration of the training S102, evaluation, and re-annotation S202, the second machine learning algorithm is improved, which consequently leads to a better evaluation in each iteration so that annotation errors that could not be detected in the first iteration may be possible to detect one of the subsequent iterations.

Moreover, in some embodiments, the second machine learning algorithm is a regression machine learning algorithm, and wherein the indications of annotation errors are defined by an error metric between the prediction in the output dataset and the corresponding annotation in the annotated dataset exceeding a threshold. For example, if the second machine learning algorithm is configured to determine/predict a distance to an object, and an image of the output dataset has a prediction of 5 meters to a certain object while the corresponding image in the annotated dataset has an annotation defining a distance of 15 meters, and the threshold is set to 2 meters, then that annotated image will be a part of the erroneous dataset. Same as before, the erroneous dataset may be formed from the X % of the annotated dataset associated with the largest difference between prediction and annotation.

Further, the method comprises re-annotating S202 the erroneous dataset in order to form a re-annotated dataset. The re-annotation may for example be performed as a manual audit-process (at the annotating entity 200 or alternatively at the client entity 100) where the annotations of the erroneous dataset are manually corrected.

The re-annotated dataset is then fed back into the training S102 and evaluation loop (as indicated by the curved arrow in FIG. 2), until a number of images of the annotated dataset that are associated with indications of annotation errors and/or missing annotations is below a threshold. In other words, the training, evaluation and re-annotation is performed until the evaluation indicates that are no more (or only a few) images associated with indications of annotation errors and/or missing annotations in the annotated dataset.

Furthermore, in some embodiments, the method further comprises training S203 the first machine learning algorithm based on the re-annotated dataset used in a last iteration when the number of images associated with indications of annotation errors and/or missing annotations got below the threshold. In other words, once the number of images of the annotated dataset that are associated with indications of annotation errors and/or missing annotations is below a threshold, a final dataset is formed with "verified" annotations, that may subsequently be used to train and update the first machine-learning algorithm (i.e. the "annotating" machine-learning algorithm) by e.g. using this final dataset as a supervisory signal.

It should be noted that in some embodiments the entire annotated S201 dataset is used in the training S102, the evaluation S103, S104 and re-annotation process. Thus, "at least a first subset" and "at least a second subset" may both be the entire annotated S201 (and re-annotated S202) dataset.

However, in order to avoid issues with bias in the training S102 and evaluation S103, S104 processes one can adopt an additional inner loop for the training S103 and processing S103 scheme. In more detail, the annotated S201 dataset may be divided into N portions of data [1, 2, 3 . . . N], where N is a positive integer larger than 1. Then, the second machine learning algorithm is trained with all portions except for the first portion out of the N portions, while the processing S103 is done on the first portion (i.e. the first portion is provided as input to the trained second machine learning algorithm). Accordingly, in reference to the aforementioned terminology, "a first subset" is then the dataset [2, 3 . . . N], while "a second subset" is the first portion.

This loop is then repeated sequentially, where N−1 portions are used for training S102 while the "excluded" portion is used for the processing S103 and generating and output dataset until all of the N portions of the annotated S201 dataset have been used S103 as input to the second machine learning algorithm. Thus, when all of the N portions have served as input to the second machine learning algorithm, one will have N output datasets comprising predictions of the one or more features. The predictions in the N output datasets are then compared S104 with the annotated datasets in order to extract the erroneous dataset in accordance with any one of the embodiments discussed in the foregoing.

The above-described embodiments have been illustrated and exemplified from a "system perspective" where some of the method steps are performed by a first entity (client entity) 100 and the others are performed by a second entity (annotating entity). However, as the skilled person realizes, all of the steps may be performed by a single entity.

Executable instructions for performing at least some of these functions are, optionally, included in a non-transitory computer-readable storage medium or other computer program product configured for execution by one or more processors.

The evaluation process as proposed herein allows for generating "scores" for individual annotations in the annotated datasets, instead of the entire image (which may comprise plurality of annotations), in an efficient and cost-effective manner. Thereby mitigating the problem of having the entire image evaluated based on an aggregate score/evaluation of the individual annotation, which is far more labor-intensive in terms of extracting the actual erroneous annotations. Conventionally, one would score entire images by their quality of annotation, and manually write a description of what is wrong in the image, whereupon it would be submitted for re-annotation.

Thus, an advantage of some embodiments is that not only is the general data refinement process improved for data annotation and machine-learning in terms of time efficiency and cost effectiveness.

Moreover, due to the general improvement in data quality, an advantage of some embodiments is that the performance of the supervised machine-learning algorithms used in the processes described herein may be improved at a higher pace and at a lower cost as compared to conventional solutions.

The invention has been presented above with reference to specific embodiments. However, other embodiments than the above described are possible and within the scope of the invention. Different method steps than those described above, performing the at least parts of the method by hardware or software, may be provided within the scope of the invention. Thus, according to an exemplary embodiment, there is provided a non-transitory computer-readable storage medium storing one or more programs configured to be executed by one or more processors of a processing system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) (associated with the processing system) may be or include any number of hardware components for conducting data or signal processing or for executing computer code stored in memory. The processing system has an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to some embodiments the memory is communicably connected to the processor (e.g., via a circuit or any other wired, wireless, or network connection) and includes computer code for executing one or more processes described herein.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:

1. A method for improving annotated datasets for training machine-learning algorithms, the method comprising:
   i) annotating a dataset by a first machine-learning algorithm, wherein the dataset comprises a plurality of images and wherein the first machine-learning algorithm is configured to annotate the plurality of images by generating annotations for one or more features comprised in the plurality of images;
   ii) training a second machine learning algorithm based on at least a first subset of the annotated dataset;
   iii) evaluating the annotated dataset by:
      a. using at least a second subset of the annotated dataset as an input dataset for the trained second machine learning algorithm in order to generate an output dataset comprising predictions of the one or more features; and
      b. comparing the predictions generated by the trained second machine learning algorithm with the annotations generated by the first machine learning algorithm in order to extract an erroneous dataset from the input dataset, wherein the erroneous dataset comprises images associated with indications of annotation errors and/or missing annotations in the annotated dataset;
   iv) re-annotating the erroneous dataset so to form a re-annotated dataset; and
   v) repeating step ii) on the re-annotated dataset and repeating steps iii)-iv) until a number of images associated with indications of annotation errors and/or missing annotations is below a threshold.

2. The method according to claim 1, further comprising: training the first machine learning algorithm based on the re-annotated dataset used in a last iteration when the number of images associated with indications of annotation errors and/or missing annotations got below the threshold.

3. The method according to claim 1, wherein the dataset comprises at least one of:
   a plurality of monocular camera images;
   a plurality of stereo camera images;
   a plurality of radar images; and
   a plurality of LiDAR images.

4. The method according to claim 1, wherein the training of the second machine learning algorithm comprises using supervised learning with the first subset and a corresponding subset of the dataset used in the annotation, wherein the first subset forms a supervisory signal for the corresponding subset of the dataset used in the annotation.

5. The method according to claim 1, wherein the second machine learning algorithm is a classification machine learning algorithm, and wherein the indications of annotation errors are defined by a confidence score of the prediction being below a threshold.

6. The method according to claim 1, wherein the second machine learning algorithm is a regression machine learning algorithm, and wherein the indications of annotation errors are defined by an error metric between the prediction in the output dataset and the corresponding annotation in the annotated dataset exceeding a threshold.

7. A method for improving annotated datasets for training machine-learning algorithms, the method comprising:
   i) obtaining an annotated dataset comprising a plurality of images and annotations for one or more features comprised in the plurality of images;
   ii) training a machine learning algorithm based on at least a first subset of the annotated dataset;
   iii) evaluating the annotated dataset by:
      a. using at least a second subset of the annotated dataset as an input dataset for the trained machine learning algorithm in order to generate an output dataset comprising predictions of the one or more features; and
      b. comparing the predictions generated by the trained machine learning algorithm with the annotations generated by the first machine learning algorithm in order to extract an erroneous dataset from the input dataset, wherein the erroneous dataset comprises images associated with indications of annotation errors and/or missing annotations in the annotated dataset;
   iv) obtaining a re-annotated dataset based on the erroneous dataset; and
   v) repeating step ii) on the re-annotated dataset and repeating steps iii)-iv) until a number of images associated with indications of annotation errors and/or missing annotations is below a threshold.

8. The method according to claim 7, wherein the annotated dataset is received from a remote entity comprising an annotating machine learning algorithm configured to annotate the plurality of images by generating annotations for the one or more features comprised in the plurality of images, the method further comprising:
   transmitting the re-annotated dataset used in a last iteration when the number of images associated with indications of annotation errors and/or missing annotations got below the threshold to the remote entity.

9. The method according to claim 7, further comprising:
   obtaining a first dataset from sensor data generated by one or more sensor devices; and
   selecting a subset of the first dataset, the selected subset forming the dataset used for annotation.

10. The method according to claim 7, wherein the dataset used for annotation comprises at least one of:
   a plurality of monocular camera images;
   a plurality of stereo camera images;
   a plurality of radar images; and
   a plurality of LiDAR images.

11. The method according to claim 7, wherein the training of the machine learning algorithm comprises using supervised learning with the first subset and a corresponding subset of the dataset used in the annotation, wherein the first subset forms a supervisory signal for the corresponding subset of the dataset used in the annotation.

12. The method according to claim 7, wherein the machine learning algorithm is a classification machine learning algorithm, and wherein the indications of annotation errors is defined by a confidence score of the prediction being below a threshold.

13. The method according to claim 7, wherein the machine learning algorithm is a regression machine learning algorithm, and wherein the indications of annotation errors is defined by an error metric between the prediction and the annotation in the output dataset exceeding a threshold.

14. A method for improving annotated datasets for training machine-learning algorithms, the method comprising:
   i) annotating a dataset by means of a first machine-learning algorithm, wherein the dataset comprises a plurality of images and wherein the first machine-learning algorithm is configured to annotate the plurality of images by generating annotations for one or more features comprised in the plurality of images;
   ii) transmitting the annotated dataset to a remote entity comprising a second machine learning algorithm configured to use the annotated dataset as an input dataset in order to generate an output dataset comprising predictions of the one or more features;
   iii) obtaining an erroneous dataset comprising images associated with indications of annotation errors and/or missing annotations in the annotated dataset;
   iv) re-annotating the erroneous dataset so to form a re-annotated dataset;
   v) repeating step ii) on the re-annotated dataset and repeating steps iii)-iv) until a number of images associated with indications of annotation errors and/or missing annotations is below a threshold; and
   vi) training the first machine learning algorithm based on the re-annotated dataset used in a last iteration when the number of images associated with indications of annotation errors and/or missing annotations got below the threshold.

15. The method according to claim 14, wherein the dataset comprises at least one of:
   a plurality of monocular camera images;
   a plurality of stereo camera images;
   a plurality of radar images; and
   a plurality of LiDAR images.

* * * * *